US010818092B2

(12) United States Patent
Balan et al.

(10) Patent No.: US 10,818,092 B2
(45) Date of Patent: *Oct. 27, 2020

(54) ROBUST OPTICAL DISAMBIGUATION AND TRACKING OF TWO OR MORE HAND-HELD CONTROLLERS WITH PASSIVE OPTICAL AND INERTIAL TRACKING

(71) Applicant: Microsoft Technology Licensing, LLC, Redmond, WA (US)

(72) Inventors: Alexandru Octavian Balan, Sammamish, WA (US); Constantin Dulu, Bothell, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/370,354

(22) Filed: Mar. 29, 2019

(65) Prior Publication Data
US 2019/0228584 A1 Jul. 25, 2019

Related U.S. Application Data

(63) Continuation of application No. 15/274,361, filed on Sep. 23, 2016, now Pat. No. 10,249,090.
(Continued)

(51) Int. Cl.
*G09G 5/00* (2006.01)
*G06T 19/00* (2011.01)
(Continued)

(52) U.S. Cl.
CPC .......... *G06T 19/006* (2013.01); *G02B 27/017* (2013.01); *G02B 27/0172* (2013.01); *G06F 3/011* (2013.01); *G06F 3/012* (2013.01); *G06F 3/013* (2013.01); *G06F 3/0325* (2013.01); *G06F 3/0346* (2013.01); *G02B 2027/014* (2013.01); *G02B 2027/0178* (2013.01)

(58) Field of Classification Search
None
See application file for complete search history.

(56) References Cited

U.S. PATENT DOCUMENTS

2007/0081695 A1* 4/2007 Foxlin .................. G06T 7/73
382/103
2007/0211050 A1* 9/2007 Ohta .................... G06F 3/0346
345/426
(Continued)

*Primary Examiner* — Anh-Tuan V Nguyen
(74) *Attorney, Agent, or Firm* — Workman Nydegger

(57) ABSTRACT

Methods for disambiguation and tracking of two or more wireless hand-held controllers with passive optical and inertial tracking within a system having a head mounted virtual or augmented reality display device having a forward facing optical sensor having a field of view, and wherein the display device interfaces with wireless hand-held inertial controllers for providing user input to the display device, with each controller two passive optically reflective markers, one marker being position at or adjacent each end of the controller and being separated by a known distance, and each controller also including an onboard inertial measurement unit for providing inertial data corresponding to its orientation.

20 Claims, 12 Drawing Sheets

Related U.S. Application Data

(60) Provisional application No. 62/347,831, filed on Jun. 9, 2016.

(51) Int. Cl.
*G06F 3/01* (2006.01)
*G06F 3/03* (2006.01)
*G02B 27/01* (2006.01)
*G06F 3/0346* (2013.01)

(56) References Cited

U.S. PATENT DOCUMENTS

2011/0183751 A1\* 7/2011 Ueshima ................ A63F 13/12
 463/30
2015/0070389 A1\* 3/2015 Goto ...................... G06T 7/00
 345/633
2016/0256223 A1\* 9/2016 Haimerl ................ A61B 34/20

\* cited by examiner

US 10,818,092 B2

ROBUST OPTICAL DISAMBIGUATION AND TRACKING OF TWO OR MORE HAND-HELD CONTROLLERS WITH PASSIVE OPTICAL AND INERTIAL TRACKING

CROSS-REFERENCE TO RELATED APPLICATIONS

This application is a continuation of U.S. application Ser. No. 15/274,361, filed Sep. 23, 2016, and titled "ROBUST OPTICAL DISAMBIGUATION AND TRACKING OF TWO OR MORE HAND-HELD CONTROLLERS WITH PASSIVE OPTICAL AND INERTIAL TRACKING," and which will issue as U.S. Pat. No. 10,249,090 on Apr. 2, 2019, and which application claims priority to, and the benefit of, U.S. Prov. App. Ser. No. 62/347,831, filed Jun. 19, 2016, and titled "ROBUST OPTICAL DISAMBIGUATION AND TRACKING OF TWO OR MORE HAND-HELD CONTROLLERS WITH PASSIVE OPTICAL AND INERTIAL TRACKING." The entire contents of each of the foregoing applications are incorporated by reference herein in their entireties.

BACKGROUND

Background and Relevant Art

Mixed reality is a technology that allows virtual imagery to be mixed with a real world physical environment in a display. Systems for mixed reality may include, for example, see through head mounted display (HMD) devices or smart phones with built in cameras. Such systems typically include processing units which provide the imagery under the control of one or more applications. Full virtual reality environments in which no real world objects are viewable can also be supported using HMD and other devices.

Such systems may also include one or more wireless hand-held inertial controllers that the user of the system can manipulate to interact with the HMD and provide user input to the HMD, including, but not limited to, controlling and moving a virtual cursor, selection, movement and rotation of objects, scrolling, etc.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above. Furthermore, the subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In one embodiment, the invention is directed to methods for disambiguation and tracking of two or more wireless hand-held controllers with passive optical and inertial tracking within a system having a head mounted virtual or augmented reality display device having a forward facing optical sensor having a field of view, and wherein the display device interfaces with wireless hand-held inertial controllers for providing user input to the display device, with each controller two passive optically reflective markers, one marker being position at or adjacent each end of the controller and being separated by a known distance, and each controller also including an onboard inertial measurement unit for providing inertial data corresponding to its orientation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Set forth below is an overview of a representative environment in which the apparatus and systems disclosed and/or claimed in this application can be implemented. It should be clearly understood and appreciated, however, that such descriptions are merely provided as an example of one representative environment and that the inventions described herein can be readily adapted to other HMD devices and AR and VR systems/environments, as well as other traditional computing environments and systems, including other conventional display devices.

Figure 1:
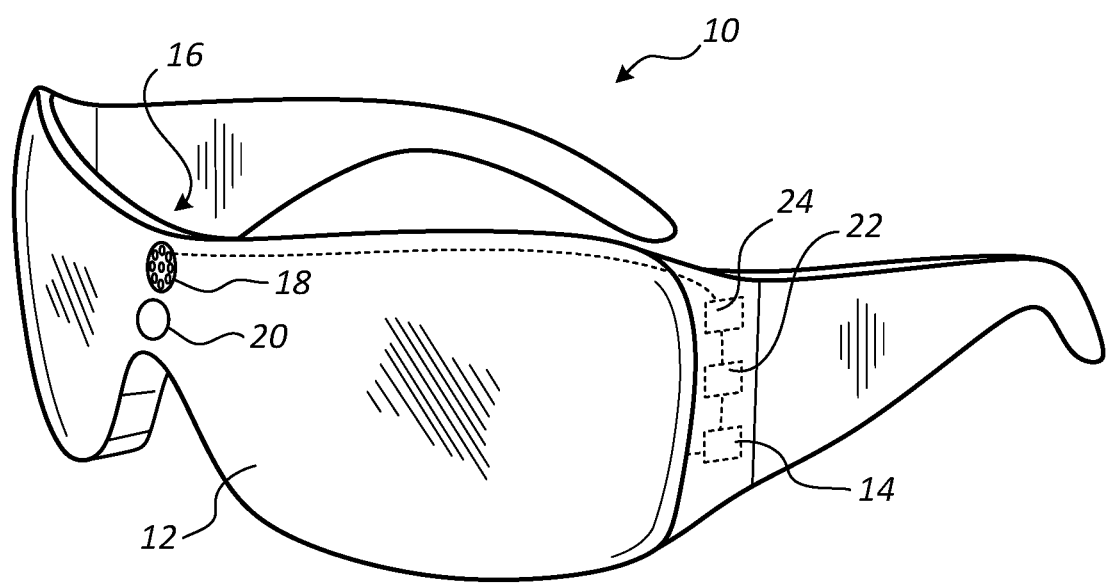
FIG. 1 is a schematic representation of one embodiment of a head mounted virtual or augmented reality display.
Figure 2:
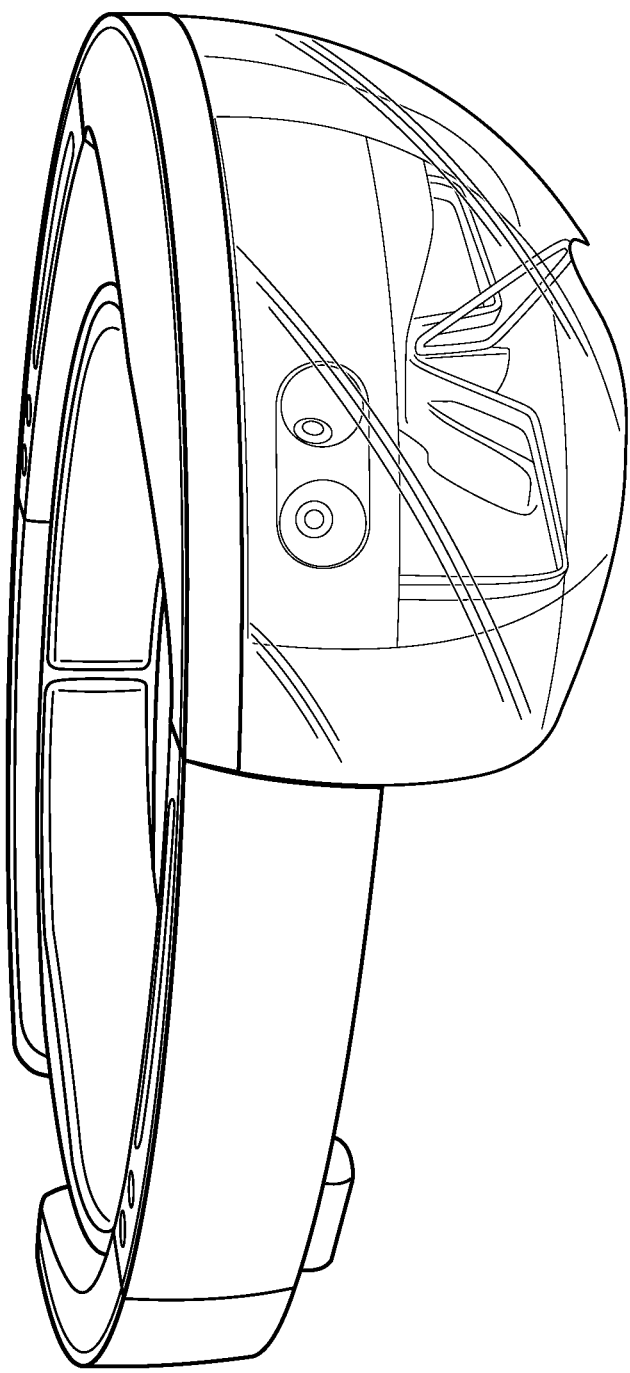
FIG. 2 is a general perspective rendering of one embodiment of the Microsoft Hololens.
Figure 3:
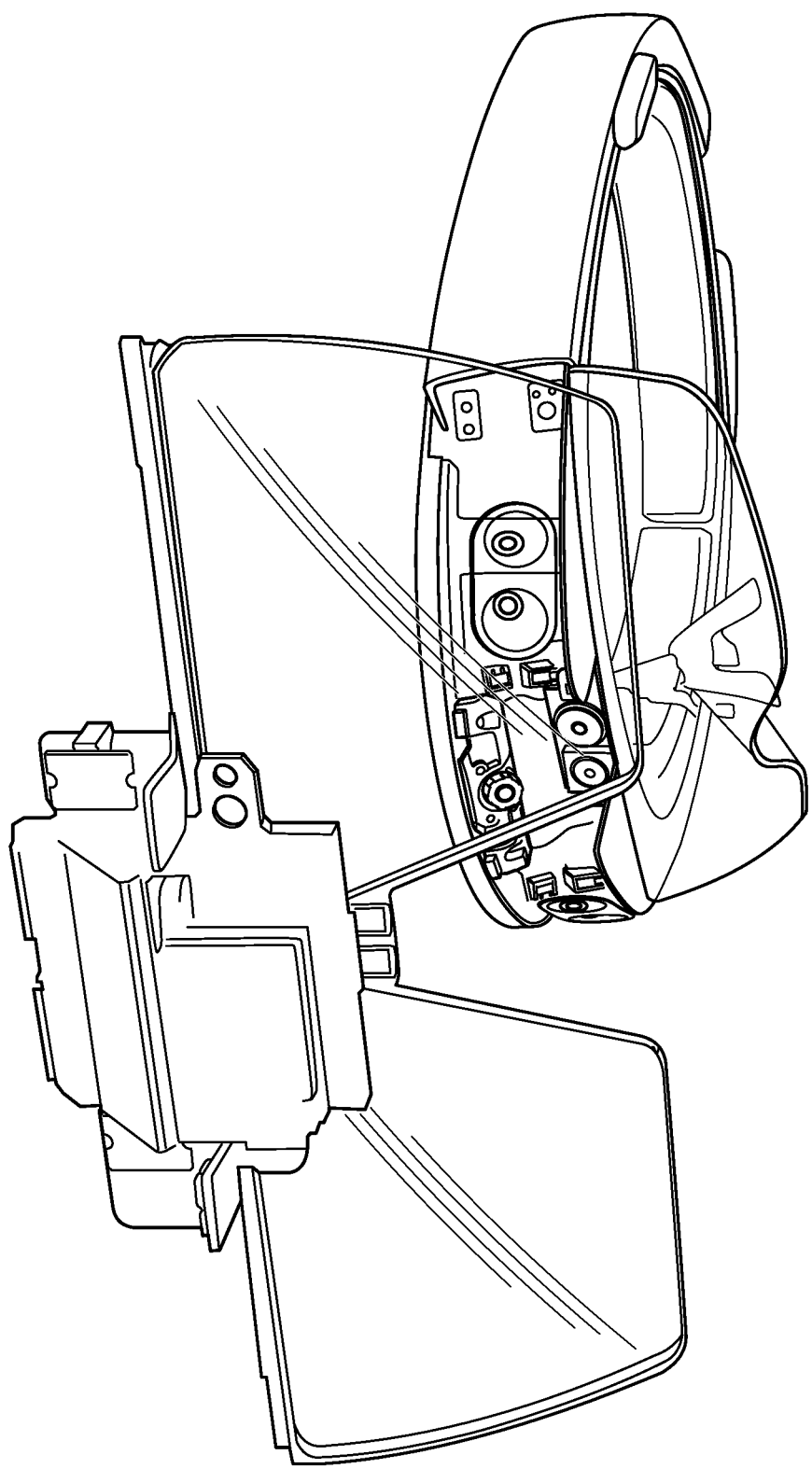
FIG. 3 is an exploded perspective rendering of one embodiment of the Microsoft Hololens, further illustrating one embodiment of a stereoscopic display system.
Figure 4:
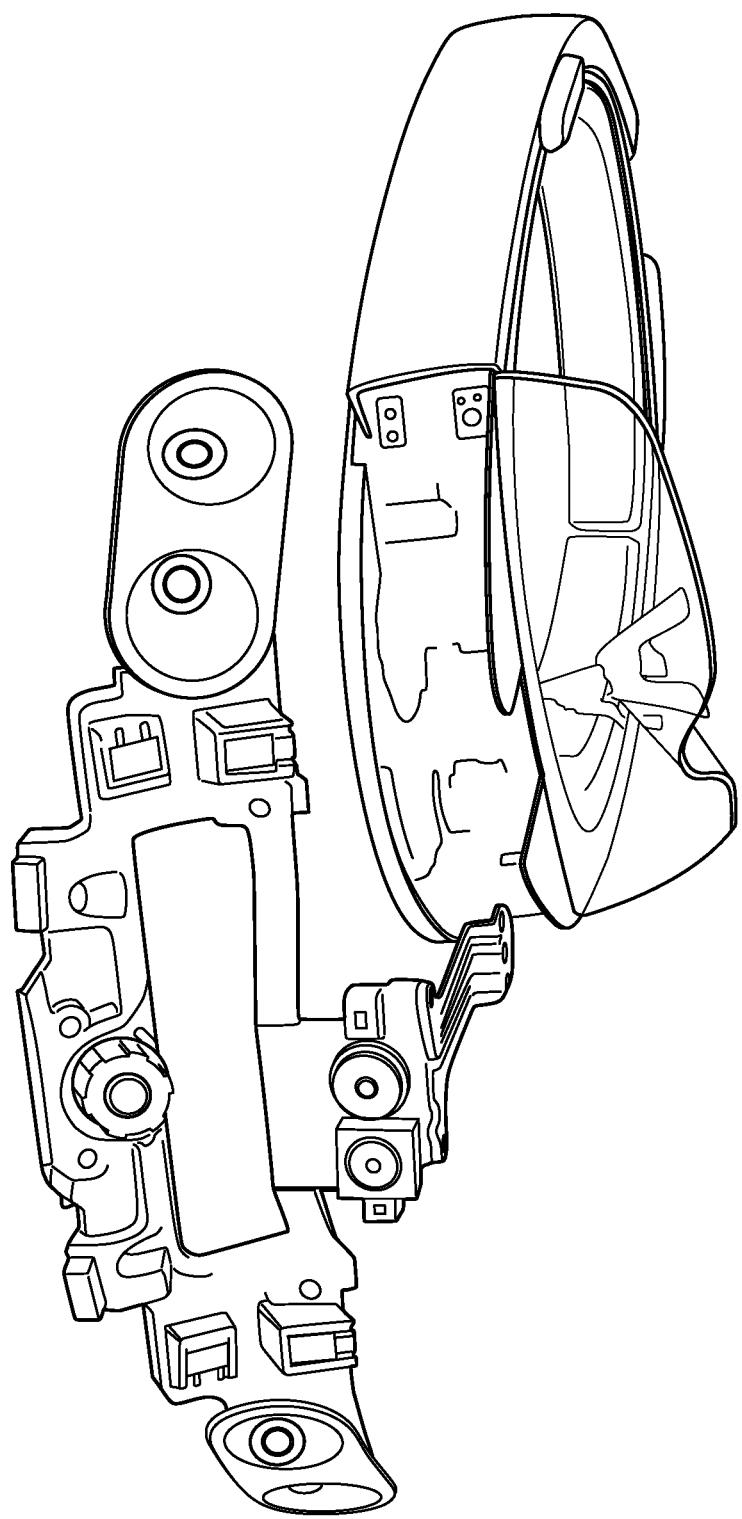
FIG. 4 is a general perspective rendering of one embodiment of the Microsoft Hololens, further illustrating one embodiment of an optical sensor system.
Figure 5:
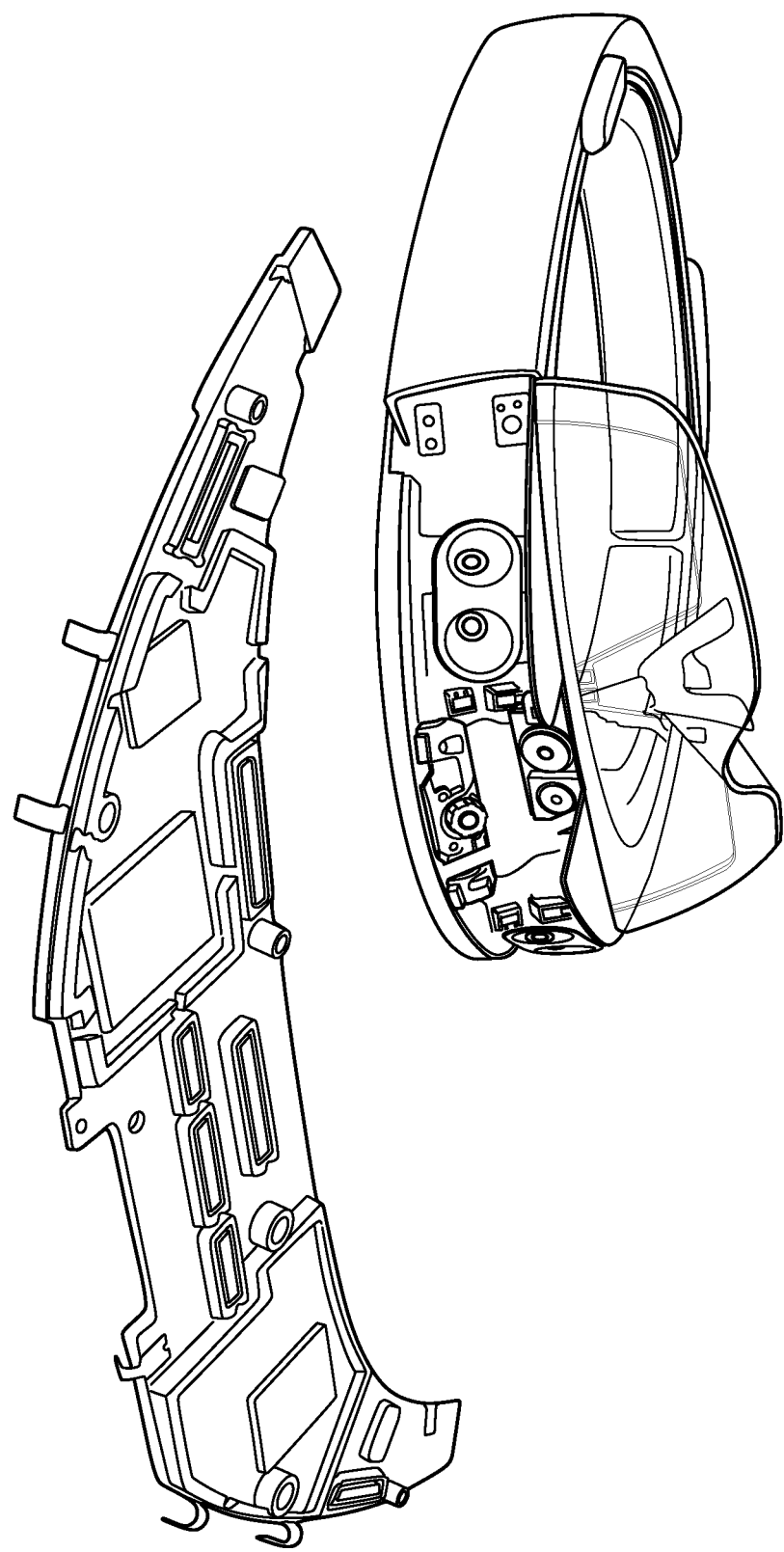
FIG. 5 is a general perspective rendering of one embodiment of the Microsoft Hololens, further illustrating one embodiment of a controller board and related on-board processors.

FIG. 1 schematically illustrates an example of a HMD device 10. FIGS. 2-5 are illustrations of the Microsoft Hololens, which represents one recent embodiment of a HMD.

Referring to FIGS. 1-5 generally, a HMD device 10 takes the form of wearable glasses or goggles, but it will be appreciated that other forms are possible. The HMD device 10 may be configured in an augmented reality configuration to present an augmented reality environment, and thus may include an at least partially see-through stereoscopic display 12 that may be configured to visually augment an appearance of a physical environment being viewed by the user through the at least partially see-through stereoscopic display 12. In some examples, the at least partially see-through stereoscopic display 12 may include one or more regions that are transparent (e.g., optically clear) and may include one or more regions that are opaque or semi-transparent. In other examples, the at least partially see-through stereoscopic display 12 may be transparent (e.g., optically clear) across an entire usable display surface of the stereoscopic display 12. Alternatively, the HMD device 10 may be configured in a virtual reality configuration to present a full virtual reality environment, and thus the stereoscopic display 12 may be a non-see-though stereoscopic display. The HMD device 10 may be configured to display virtual three dimensional environments to the user via the non-see-through stereoscopic display. The HMD device 10 may be configured to display a virtual representation such as a three dimensional graphical rendering of the physical environment in front of the user that may include additional virtual objects or may be configured to display camera-captured images of the physical environment along with additional virtual objects including the virtual cursor overlaid on the camera-captured images.

For example, the HMD device 10 may include an image production system 14 that is configured to display virtual objects to the user with the stereoscopic display 12. In the augmented reality configuration with an at least partially see-through display, the virtual objects are visually superimposed onto the physical environment that is visible through the display so as to be perceived at various depths and locations. In the virtual reality configuration, the image production system 14 may be configured to display virtual objects to the user with the non-see-through stereoscopic display, such that the virtual objects are perceived to be at various depths and locations relative to one another. In one embodiment, the HMD device 10 may use stereoscopy to visually place a virtual object at a desired depth by displaying separate images of the virtual object to both of the user's eyes. Using this stereoscopy technique, the HMD device 10 may control the displayed images of the virtual objects, such that the user will perceive that the virtual objects exist at a desired depth and location in the viewed physical environment. In one example, the virtual object may be a virtual cursor that is displayed to the user, such that the virtual cursor appears to the user to be located at a desired location in the virtual three dimensional environment. In the augmented reality configuration, the virtual object may be a holographic cursor that is displayed to the user, such that the holographic cursor appears to the user to be located at a desired location in the real world physical environment.

The HMD device 10 includes an optical sensor system 16 that may include one or more optical sensors. In one example, the optical sensor system 16 includes an outward facing optical sensor 18 that may be configured to detect the real-world background from a similar vantage point (e.g., line of sight) as observed by the user through the at least partially see-through stereoscopic display 12. The optical sensor system 16 may additionally include an inward facing optical sensor 20 that may be configured to detect a gaze direction of the user's eye. It will be appreciated that the outward facing optical sensor 18 may include one or more component sensors, including an RGB camera and a depth camera. The RGB camera may be a high definition camera or have another resolution. The depth camera may be configured to project non-visible light, such as infrared (IR) radiation, and capture reflections of the projected light, and based thereon, generate an image comprised of measured depth data for each pixel in the image. This depth data may be combined with color information from the image captured by the RGB camera, into a single image representation including both color data and depth data, if desired. In a virtual reality configuration, the color and depth data captured by the optical sensor system 16 may be used to perform surface reconstruction and generate a virtual model of the real world background that may be displayed to the user via the display 12. Alternatively, the image data captured by the optical sensor system 16 may be directly presented as image data to the user on the display 12.

The HMD device 10 may further include a position sensor system 22 that may include one or more position sensors, such as one or more inertial measurement unit (IMU) that incorporates a 3-axis accelerometer, 3-axis gyroscope and/or a 3-axis magnetometer, global positioning system(s), multilateration tracker(s), and/or other sensors that output position sensor information useable as a position, orientation, and/or movement of the relevant sensor.

Optical sensor information received from the optical sensor system 16 and/or position sensor information received from position sensor system 22 may be used to assess a position and orientation of the vantage point of HMD device 10 relative to other environmental objects. In some embodiments, the position and orientation of the vantage point may be characterized with six degrees of freedom (e.g., world-space X, Y, Z, ($\theta_{pitch}$, $\theta_{yaw}$ and $\theta_{roll}$). The vantage point may be characterized globally or independent of the real-world background. The position and/or orientation may be determined with an on-board computing system (e.g., on-board computing system 24) and/or an off-board computing system. Typically, frames of reference of all sensors located on board HMD device 10 are factory aligned and calibrated to resolve six degrees of freedom relative to world-space.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world.

Additionally, the optical sensor information received from the optical sensor system 16 may be used to identify and track objects in the field of view of optical sensor system 16. For example, depth data captured by optical sensor system 16 may be used to identify and track motion of a user's hand. The tracked motion may include movement of the user's hand in three-dimensional space, and may be characterized with six degrees of freedom (e.g., world-space X, Y, Z, $\theta_{pitch}$, $\theta_{yaw}$ and $\theta_{roll}$). The tracked motion may also be used to identify and track a hand gesture made by the user's hand. For example, one identifiable hand gesture may be moving a forefinger upwards or downwards. It will be appreciated that other methods may be used to identify and track motion of the user's hand. For example, optical tags may be placed at known locations on the user's hand or a glove worn by the user, and the optical tags may be tracked through the image data captured by optical sensor system 16.

It will be appreciated that the following examples and methods may be applied to both a virtual reality and an augmented reality configuration of the HMD device 10. In a virtual reality configuration, the display 12 of the HMD device 10 is a non-see-through display, and the three dimensional environment is a virtual environment displayed to the user. The virtual environment may be a virtual model generated based on image data captured of the real-world background by optical sensor system 16 of the HMD device 10.

Microsoft Hololens

One example of a HMD is the Microsoft Hololens, which is a pair of mixed reality head-mounted smartglasses. Hololens has see-through holographic lenses that use an advanced optical projection system to generate multi-dimensional full-color holograms with very low latency so a user can see holographic objects in a real world setting.

Located at the front of the Hololens are sensors and related hardware, including cameras and processors. The Hololens also incorporates an inertial measurement unit (IMU), which includes an accelerometer, gyroscope, and a magnetometer, four "environment understanding" sensors, an energy-efficient depth camera with a 120°×120° angle of view, a forward-facing 2.4-megapixel photographic video camera, a four-microphone array, and an ambient light sensor. Hololens contains advanced sensors to capture information about what the user is doing and the environment the user is in. The built in cameras also enable a user to record (mixed reality capture (MRC)) HD pictures and video of the holograms in the surrounding world to share with others.

Enclosed within the visor is a pair of transparent combiner lenses, in which the projected images are displayed in the lower half. The Hololens must be calibrated to the interpupillary distance (IPD), or accustomed vision of the user.

Along the bottom edges of the side, located near the user's ears, are a pair of small, 3D audio speakers. The speakers do not obstruct external sounds, allowing the user to hear virtual sounds, along with the environment. Using head-related transfer functions, the Hololens generates binaural audio, which can simulate spatial effects; meaning the user, virtually, can perceive and locate a sound, as though it is coming from a virtual pinpoint or location.

On the top edge are two pairs of buttons: display brightness buttons above the left ear, and volume buttons above the right ear. Adjacent buttons are shaped differently—one concave, one convex—so that the user can distinguish them by touch.

At the end of the left arm is a power button and row of five, small individual LED nodes, used to indicate system status, as well as for power management, indicating battery level and setting power/standby mode. A USB 2.0 micro-B receptacle is located along the bottom edge. A 3.5 mm audio jack is located along the bottom edge of the right arm.

In addition to a central processing unit (CPU) and graphics processing unit (GPU), Hololens features a custom-made Microsoft Holographic Processing Unit (HPU), a coprocessor manufactured specifically for the Hololens. The main purpose of the HPU is processing and integrating data from the sensors, as well as handling tasks such as spatial mapping, gesture recognition, and voice and speech recognition. The HPU processes terabytes of information from the Hololens's sensors from real-time data.

The lenses of the Hololens use optical waveguides to color blue, green, and red across three different layers, each with diffractive features. A light engine above each combiner lens projects light into the lens, a wavelength which then hits a diffractive element and is reflected repeatedly along a waveguide until it is output to the eye. Similar to that of many other optical head-mounted displays, the display projection for the Hololens occupies a limited portion of the user's field of view (FOV), particularly in comparison to virtual reality head-mounted displays, which typically cover a much greater field of view.

The Hololens contains an internal rechargeable battery, but can be operated while charging. Hololens also features IEEE 802.11ac Wi-Fi and Bluetooth 4.1 Low Energy (LE) wireless connectivity.

With Hololens a user can create and shape holograms with gestures, communicate with apps using voice commands, and navigate with a glance, hand gestures, Controllers and/or other pointing devices. Hololens understands gestures, gaze, and voice, enabling the user to interact in the most natural way possible. With spatial sound, Hololens synthesizes sound so the user can hear holograms from anywhere in the room, even if they are behind the user.

Additional details about the Hololens are provided in U.S. patent application Ser. No. 62/029,351, filed Jul. 25, 2014, and entitled "Head Mounted Display Apparatus," which is incorporated herein by reference.

As mentioned above, the Hololens includes a depth camera, which is capable of detecting the 3D location of objects located within the depth camera's FOV. Technical details of exactly how the depth camera accomplishes such detection are known to those skilled in the art, but are not necessary for the present disclosure. Suffice it to say that the depth camera is able to accurately detect, on a pixel-by-pixel basis, the exact 3D location of each point on a physical object within the camera's field of view. While the Hololens uses a depth camera, stereoscopic optics can also be used to detect the distance of objects from the HMD and the locations of such objects in 3D space via triangulation. In either event, such sensors can detect the 3D location (x, y and z coordinates) of real objects located within the FOV relative to the HMD. In the case of a Controller, the depth camera of the HMD can be used to detect the 3D location of the Controller relative to the HMD.

Wireless Hand-Held Controller

As previously mentioned, the Hololens has the ability to track the movement of a user's hands through space and to identify and interpret a variety of hand poses, gestures and movements to manipulate virtual objects in the AR space. Additional details regarding hand tracking, hand gesture identification, classification and recognition and/or hand pose identification, classification and recognition are provided in U.S. patent application Ser. No. 12/975,086, filed Dec. 21, 2010 and entitled "Skeletal Control of Three-Dimensional Virtual World," U.S. patent application Ser. No. 13/327,098, filed Dec. 15, 2011 and entitled "Problem States for Pose Tracking Pipeline," U.S. patent application Ser. No. 13/959,555, filed Aug. 5, 2013 and entitled "Two-Hand Interaction with Natural User Interface," and/or U.S. patent application Ser. No. 14/748,646, filed Jun. 24, 2015 and entitled "Contextual Cursor Display Based on Hand Tracking," each of which is incorporated herein by reference.

One of the challenges with hand tracking and gesture recognition, however, is that they can require a relatively high level of processing overhead. To reduce such overhead, it can be useful to provide a wireless, hand-held controller that can communicate with the HMD and allow manipulation of objects in the AR space. For example, in the case of Hololens, the headset uses Bluetooth LE to pair with a wireless, hand-held inertial controller, called a "Clicker," a thumb-sized finger-operated input device that can be used to enable the user to select, scroll, hold, and double-click to interact with virtual objects within the augmented reality space.

Typically, when a Clicker is first powered on, it typically establishes a connection with Hololens via a predetermined wireless protocol, typically via Bluetooth pairing. Once a connection is established, the Clicker is assigned a unique controller ID by Hololens. In that way, all orientation data and user inputs received from a particular Clicker can be specifically associated with that controller.

The Clicker includes an IMU, which provides orientation information with 3DOF (e.g., pitch, yaw and roll information), but it does not provide location information. When paired with Hololens, the optical sensors of the HMD can determine a general location of the Click in 3D space via various hand tracking techniques. However, such hand tracking techniques may generally not produce the accuracy and resolution of location information that is needed in today's VR and AR environments. In addition, such hand tracking techniques can be computationally intensive requiring substantial processing overhead. Thus, what is needed is a wireless, hand-held inertial controller that provides greater accuracy and resolution with 6DOF and reduces the overall processing overhead needed to achieve the results.

Figure 6:
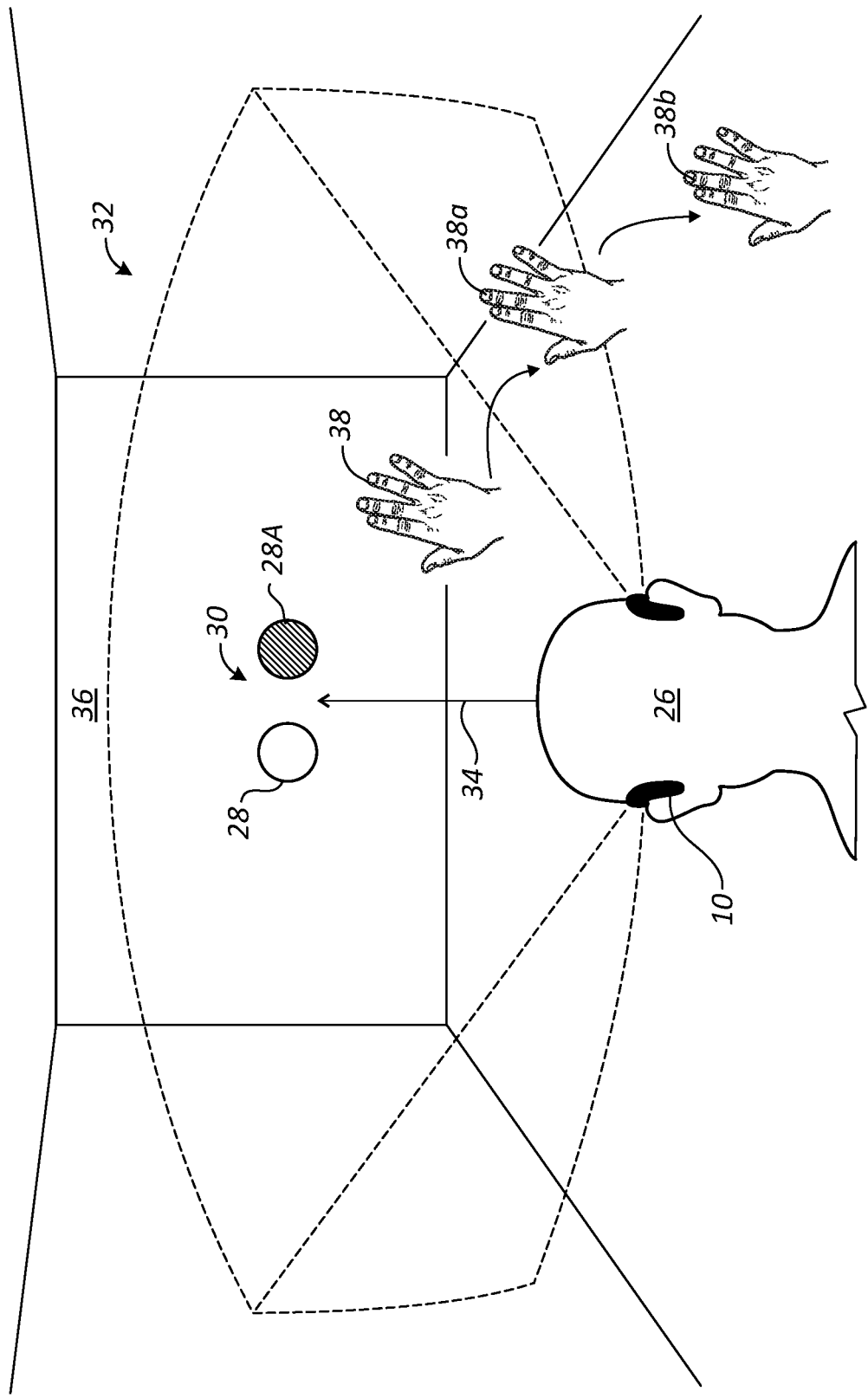
FIG. 6 is a graphical representation of one example of a possible field of view of one embodiment of an augmented reality display.

FIG. 6 illustrates an augmented reality configuration of a HMD device 10 worn by a user 26, displaying a virtual cursor, which is a holographic cursor 28 in this example, on the at least partially see-through stereoscopic display 12 so as to appear to at a location 30 in a three dimensional environment 32. In the specific example shown in FIG. 6, the three dimensional environment 32 is a room in the real world, and the holographic cursor 28 is displayed on the at least partially see-through stereoscopic display such that the holographic cursor 28 appears to the user 26, to be hovering in the middle of the room at the location 30. It will be appreciated that the location 30 for the holographic cursor 28 may be calculated based on a variety of suitable methods. For example, the location 30 may be calculated based on a predetermined distance and orientation relative to the user 26, such as being two feet in front of the user 26 as one specific example.

Figure 8:
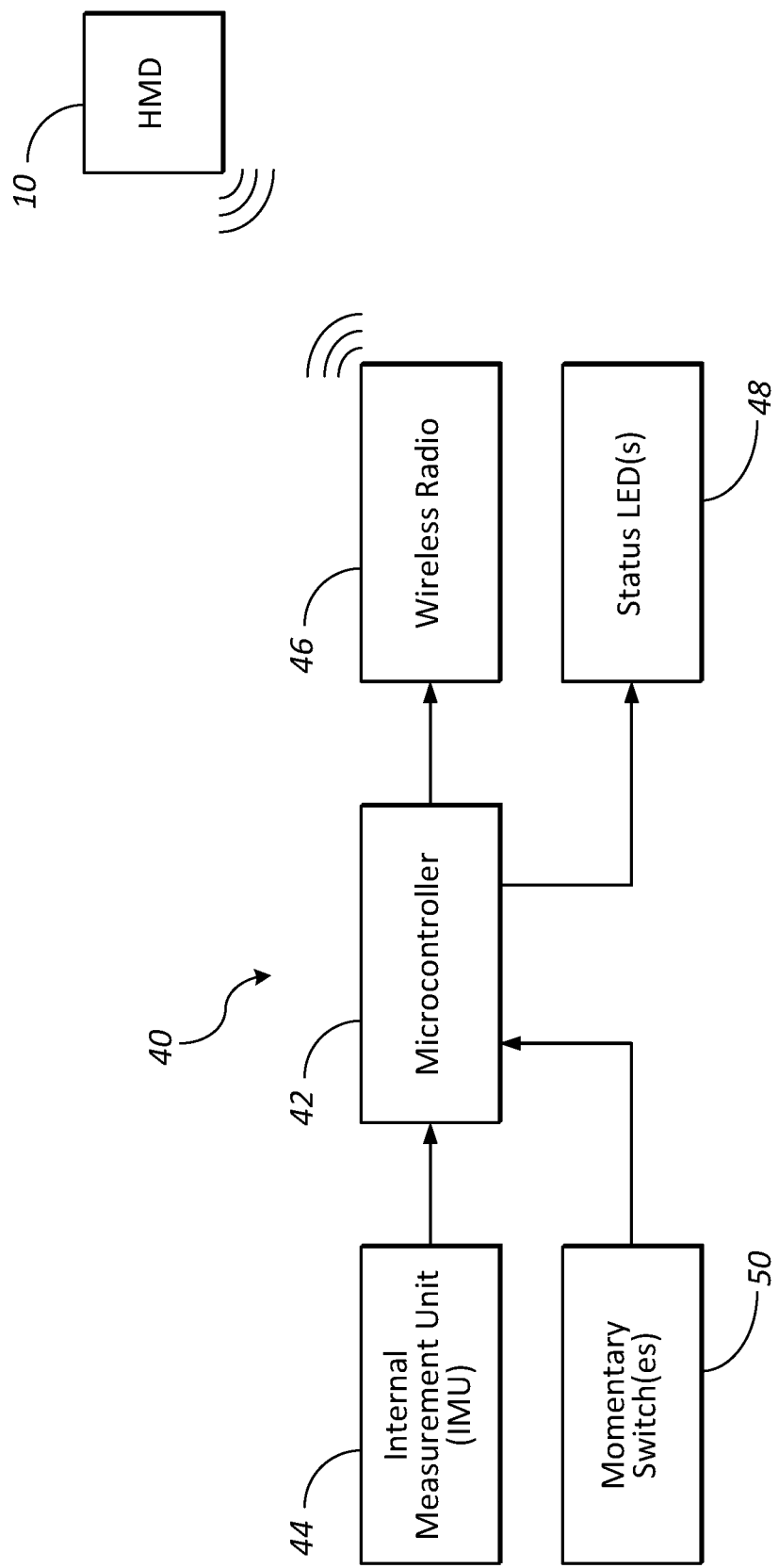
FIG. 8 is a functional block diagram illustrating the basic components of one embodiment of a wireless hand-held controller with passive optical and inertial tracking in a slim form-factor.

As another non-limiting example, the location 30 may be calculated based on a detected gaze direction 34 and a recognized object that intersects with the detected gaze direction. In this example, the recognized object may be a real object in the three dimensional environment. This example is illustrated in FIG. 8, with the recognized object being the wall 36 that is a part of the room that serves as the three dimensional environment 32. Accordingly, the intersection between the wall 36 and the detected gaze direction 34 of the user 26 may be used to calculate the location 30 for the holographic cursor 28. It may be advantageous to further ensure that the holographic cursor 28 is displayed to the user 26, such that the holographic cursor 28 is easily visible to the user 26. For example, to increase visibility, the location 30 of the holographic cursor 28 may be placed a threshold distance away from the recognized object to prevent the holographic cursor 28 from being occluded by any protrusions of the recognized object. Additionally, it may be advantageous to further calculate the location 30 of the holographic cursor 28 based on a plane that is orthogonal to the detected gaze direction 34 of the user 26. By placing the location 30 of the holographic cursor 28 on such a plane, a consistent view of the holographic cursor 28 may be maintained even as the user changes gaze direction.

Additionally, in the example illustrated in FIG. 6, the HMD device 10 worn by the user 26 may be configured to detect motion of the user's hand. Based on a series of images captured by the optical sensor system 16, the HMD device 10 may determine whether motion of hand 38 of the user 26 is trackable. For example, the user's hand at positions 38 and 38A are within the field of view of the optical sensor system 16. Accordingly, motion of the user's hand moving from position 38 to position 38A over time T1 is trackable by the HMD device 10. However, as position 38B may be outside of the field of view of the optical sensor system 16, motion of the user's hand moving from position 38A to position 38B over time T2 may not be trackable by the HMD device 10. It will be appreciated that the user's hand is determined to be trackable by the HMD when the HMD can monitor the hand for gesture input. Thus, the user's hand is deemed to be trackable, for example, when computer algorithms implemented in software executed on the processor of the HMD device 10 identify the hand in images captured by the onboard camera and begin tracking the hand, until a point in time at which those algorithms lose track of the hand. Techniques that may be used to track the hand the hand include searching for regions of similar color values and segmenting a portion of the image based on the color values from the rest of the image, as well as searching for regions of pixels that have changed, indicating foreground movement by a hand or other object. When depth information is available, the hand may be located using skeletal tracking techniques in addition or as an alternative to the above. A hand may be determined to be trackable when a confidence degree output by the algorithm indicates that the hand is being tracked with above a predetermined threshold level of confidence.

In the above embodiment, the HMD device 10 communicates to the user whether motion of the user's hand is trackable. In this embodiment, in response to at least determining that motion of the hand is trackable, the HMD device 10 modifies the visual appearance of the holographic cursor to indicate that motion of the hand is trackable. In the example illustrated in FIG. 8, the visual appearance of the holographic cursor is modified to appear as holographic cursor 28, which is an unfilled circle. Accordingly, as the user moves the hand from position 38 to position 38A over time T1, the user is shown holographic cursor having visual appearance 28 and is thus provided with the feedback that motion of the user's hand is currently trackable, and any hand gestures or hand movements will be tracked by the HMD device 10.

Further in this embodiment, in response to at least determining that motion of the hand is not trackable, the HMD device 10 modifies the visual appearance of the holographic cursor to indicate that motion of the hand is not trackable. As illustrated in FIG. 6, the visual appearance of the holographic cursor may be modified to appear as holographic cursor 28A, which has a different visual appearance than holographic cursor 28. In this example, the visual appearance of holographic cursor 28A is a filled circle. Accordingly, as the user moves the hand from position 38A to position 38B over time T2, the user is shown holographic cursor having visual appearance 28A and is thus provided with the feedback that motion of the user's hand is not currently trackable. It will be appreciated that while the example illustrated in FIG. 8 modifies the visual appearance of the holographic cursor to appear as a filled or unfilled circle, any suitable visual modification is possible. As a few other non-limiting examples, the visual appearance of the holographic cursor may be modified by changing a color, changing a shape, adding or removing an icon, or changing a size of the holographic cursor.

While the wireless controllers found in the prior art, including the Clicker, may provide orientation information with 3DOF, they do not provide location information. While hand tracking and skeletal segmentation can be combined with orientation data derived from a hand-held inertial controller to recover up to five degrees of freedom, such processes can typically require a high level or processing overhead. In addition, even with hand tracking and skeletal segmentation it can be difficult to distinguish subtle movements of the controller, particularly subtle rotational movements. In accordance with the apparatus and systems described below, it is possible to recover 6DOF with a high degree of resolution and accuracy and with reduced processing overhead.

Wireless Hand-Held Controller with Passive Optical and Inertial Tracking in a Slim Form-Factor As described in more detail below, one aspect of the invention is directed to a passive optical and inertial tracking apparatus having slim form-factor. In one embodiment, the apparatus can include: a stylus having a first end, a second end and an elongate middle portion between the first end and the second end, the stylus also including a first optically reflective marker at or proximate the first end and a second optically reflective marker at or proximate the second end; and the elongate middle portion enclosing a microcontroller, an inertial measurement unit, a communications radio and one or more buttons configured and positioned for selective actuation with a finger or thumb of a user, the inertial measurement unit tracking orientation of the hand-held controller in three dimensional space relative to a predetermined frame of reference and providing orientation and acceleration data to the microcontroller, and the communications radio providing wireless communications from the microcontroller so as to provide orientation data and user inputs to the main processor of a HMD device.

In addition to combining optical position tracking and inertial orientation tracking of a hand-held device, processing overhead can be further reduced by providing an alternate approach to identifying the location of the hand-held controller other than hand tracking and gesture recognition. In one embodiment, the hand-held controller can include an elongate form factor with a pair of passive IR markers positioned at or near each end of the controller. When combined with a source of IR radiation and an IR depth camera positioned on the HMD, the IR markers can provide an advantageous way to locate the position of the hand-held controller in 3D space, as well as provide additional orientation data that can be combined with the orientation data derived from the IMU incorporated into the hand-held controller. The use of an elongate form factor and two or more IR markers provides various advantages discussed in more detail below.

In one embodiment, the system is used to interact in virtual and augmented reality worlds experienced through HMD devices. In another embodiment, the display is external. In other words, the inventions described herein can be readily adapted to other HMD devices and AR and VR systems/environments, as well as other traditional computing systems and environments, including other conventional display devices.

In one embodiment, the controller has a stylus shape with two spherical reflective markers at each end and an IMU on-board, microcontroller, communication radio, and buttons. This form factor brings several critical advantages that makes this solution feasible. First, the form factor establishes a wide baseline between the two markers, which improves detection, segmentation, and precise estimation of the orientation of the segment connecting the two markers with high resolution. Second, at least one of the markers is visible by the optical sensor across a full range of hand orientations. With only one optical marker, a single optical marker can easily be blocked by the hand from view of the HMD within the normal range of hand movements. With two, separated markers, at least one marker will usually be visible to the HMD camera at all times.

Figure 7:
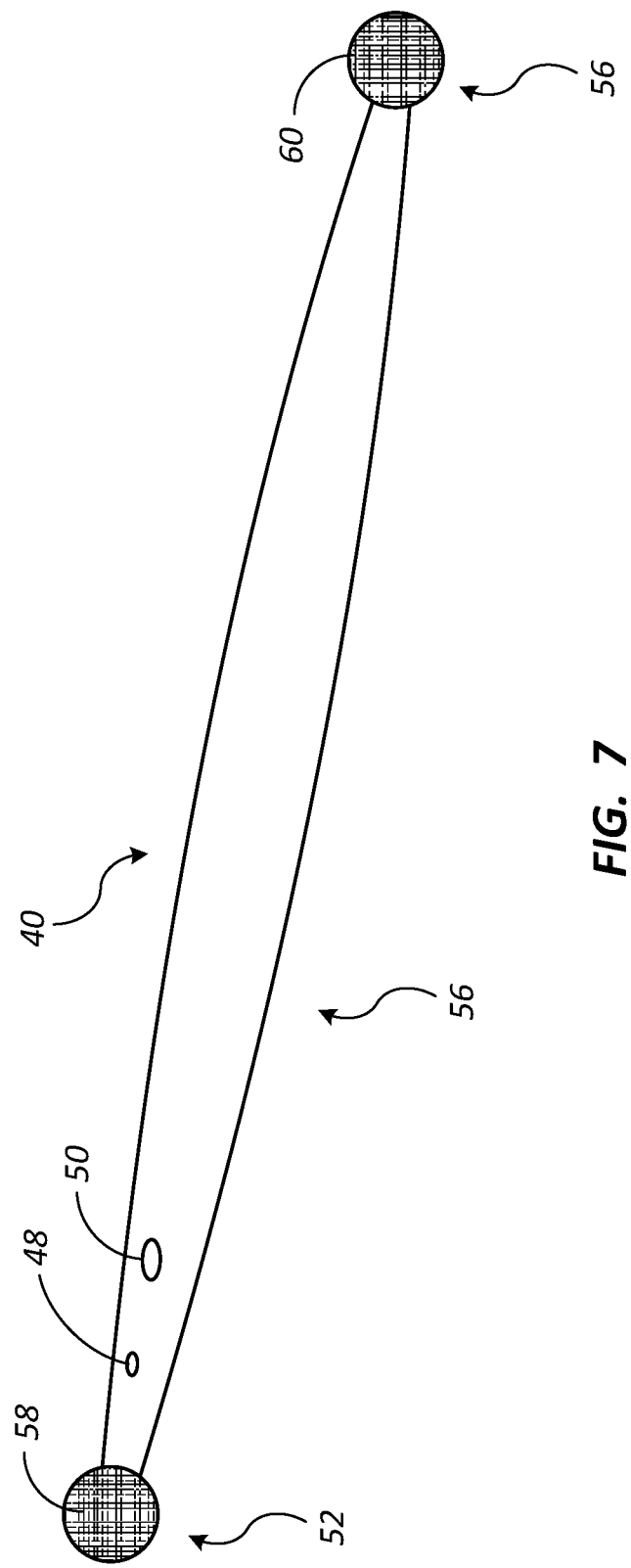
FIG. 7 is a perspective rendering of one embodiment of a wireless hand-held controller with passive optical and inertial tracking in a slim form-factor.

Referring now to FIG. 7, which illustrates one embodiment of a wireless hand-held controller with passive optical and inertial tracking in a slim form-factor 40 (hereinafter sometimes referred to simply as "Controller 40"). As shown, Controller 40 can include an elongate body forming a wand or stylus. Controller 40 has a first end 52, a second end 54 and an elongate middle portion 56. Positioned at or adjacent the first end 52 is a first passive, optically reflective marker 58. Positioned at or adjacent the second end 54 is a second passive, optically reflective marker 60.

Referring to FIGS. 7 and 8, housed within the elongate middle portion 56, Controller 40 can include an on-board microcontroller 42, its own IMU 44, a communications radio 46, a rechargeable battery (not shown), and one or more status LEDs 48. The IMU typically includes a 3-axis accelerometer and a 3-axis gyroscope, and may also include a 3-axis magnetometer. User inputs and orientation data (pitch, yaw and roll) derived from the IMU can be wirelessly communicated by the microcontroller 42 to the CPU of the HMD 10 via wireless radio 46. Controller 40 can also include one more momentary switch(es) 50 for selective activation by the user to control a virtual cursor and/or to manipulate virtual objects in various ways (such as, for example, select, move, rotate, scroll, etc.). Controller 40 can also include a USB 2.0 micro-B receptacle for charging the internal battery (not shown).

From the accelerometer and gyroscope, the IMU 44 can detect the orientation of the Controller 40, but only with three degrees of freedom, namely, pitch (elevation angle), yaw (azimuth angle) and roll (rotation). Because the accelerometer can detect the gravity vector, the vertical axis of the frame of reference of the Controller 40 is easily identified and aligned. Similarly, the gyroscope of the IMU 44 can readily detect the horizontal plane and, therefore, the horizontal plane is readily identified and aligned. If the IMU 44 also includes a magnetometer, then magnetic north can readily be identified and the frame of reference of the Controller 40 can be north aligned. If both the IMU of the HMD 10 and the IMU 44 of the Controller 40 include a magnetometer, then the frame of reference of the Controller 40 will automatically be aligned with the HMD's frame of reference (subject to some minor variations/offset and drift, which can be corrected over time).

If the IMU 44 of the Controller 40 does not include a magnetometer, then the IMU 44 arbitrarily assigns an x-axis when it powers up and then continuously tracks azimuth changes (angular rotation in the horizontal plane) from that initial frame of reference. In that case, the frame of reference of the Controller 40 will need to be aligned with or calibrated to the HMD's frame of reference, as discussed in more detail below.

As previously discussed, an IMU comprises of a combination of accelerometers and gyroscopes, plus optionally magnetometers. The data from IMU 44 can be fused to compute with high frequency and low latency the orientation of the Controller 40 relative to some initial reference frame that is gravity aligned. In addition, if the IMU 44 includes a magnetometer, the magnetometer will automatically north align the Controller's frame of reference with HMD's frame of reference and will also reduce azimuth draft.

The optical sensor system 16 of the HMD 10 tracks the position of the markers 56, 58 in 3D. Optical sensor system 16 can include an illumination source to light up the passive reflective markers 56, 58, and an imaging sensor. In one embodiment, the illumination source radiates IR radiation and the optical sensor uses an active IR depth camera to detect and directly estimate the position of the markers 56, 58 in 3D. Even though the markers are highly reflective for easy segmentation in the IR shutter images, it is still possible for the depth camera to compute depth at each pixel. In another embodiment, a stereo IR camera pair can be used to triangulate the 3D positions of markers 56, 58.

In one embodiment, the markers 56, 58 are visually hidden behind IR transmissive material, blocking light in the visible spectrum, but allowing light to pass through in the IR operating range of the optical sensor. In this way, the optical markers can be hidden from view, without limiting the functionality described herein, so that Controller 40 can assume the shape of many different objects, such as, for example, a stylus, a wand or a variety of objects typically used in VR gaming (e.g., gun, rifle, sword, sports equipment, etc.) for which precise detection of location and orientation of the Controller 40 can be very important.

The optical tracking system 16 is typically mechanically related to the display frame of reference of the HMD 10 through a rigid transform, which is refined through calibration. Without loss of generality, the HMD device 10 is assumed to be in a gravity-aligned frame of reference, through use of IMUs and/or other environment tracking sub-systems (e.g., head tracking component in an HMD).

When the optical system 16 of the HMD 10 detects an optically reflective marker (such as marker 56 or 58) within its FOV, it recovers location data with 3DOF (x, y and z). Due to the fixed geometrical relationship between two markers 56, 58 incorporated into the Controller 40, when the HMD detects both markers 56, 58 within its FOV, then two more degrees of freedom are recovered (namely, azimuth and elevation angles, also known as yaw and pitch). More specifically, this is possible because the optical system 16 is able to determine, with a high degree of precision, the exact location of each detected marker 56, 58. Further, because the geographical relationship between the two detected markers 56, 58 (in the illustrated embodiment, the geometric relationship being a known distance separating the two markers along a straight line aligned with the longitudinal axis of Controller 40), it is possible for the optical system 16 to compute (again with a high degree of precision) the elevation/pitch angle and the azimuth/rotation angle of the Controller. The missing sixth degree of freedom is the roll angle along the axis connecting the two markers, which is not optically constrained, but which is easily recovered from the IMU 44 of the Controller 40.

As previously discussed, the gravity vector is known in both the Controller 40 and the optical sensor 16 frames of reference. Whenever the Controller 40 is not horizontal, it is possible to distinguish between the two markers 56, 58 by projecting their position onto the gravity vector and comparing the elevation and azimuth angles detected by the optical system 16 of the HMD 10 with the elevation and azimuth angles as measured by the IMU 44 of the Controller 40, respectively. For example, the elevation angle (vertical tilt) of the Controller IMU 44 should be expected to match (within some tolerance) the elevation angle derived by the optical system 16 of the HMD based on the optically detected relative locations of the two markers. If such angles match (within accepted tolerance), then it is possible to uniquely identify and label each marker 56, 58 (by which marker is positioned higher than the other and vice versa). Once the optical system 16 has been able to uniquely identify each marker to a predetermined level of confidence, then a unique marker ID is associated with each marker 56 and 58. In addition, the assigned marker IDs are associated with the controller ID of Controller 40 (assigned to Controller 40 at the time Controller 40 initially paired with HMD 10) for future tracking purposes. On the other hand, mismatching values can be used to eliminate erroneous marker detections.

Similarly, the azimuth angle (horizontal heading) calculated by the optical system 16 of the HMD 10 is also expected to match (within a set tolerance) the azimuth angle of the two markers measured by IMU 44 (assuming IMU 44 incorporates a magnetometer). Alternatively, an azimuth offset between the Controller 40 and the optical sensor 16 frames of reference can be estimated by observation over several captured video frames where both markers 56, 58 are observed, and gradually updated over time to compute an appropriate azimuth offset angle and/or compensate for any IMU drift.

In subsequent frames, 6DOF tracking is still achieved even when one of the markers 56, 58 becomes blocked from view of the optical system 16 or moves outside the optical system's FOV. Since one marker is sufficient for the optical system 16 of the HMD 10 to recover position, and having previously uniquely identified each marker, the remaining orientation data can be derived from IMU 44 of Controller

40. The identity of the marker is persisted by proximity to previously estimated position of the markers.

If the Controller 40 moves completely outside the FOV of the optical sensor 16, Controller 40 can revert back to a 3DOF based on orientation data from IMU 44, and/or it can predict the position of Controller 40 based on a forward prediction algorithm, such as a Kalman filter using double integration operating on the accelerometer data from IMU 44.

The use of the reflective optical markers 56, 58 provide higher resolution and accuracy of detecting location and orientation than other methods. Even with good hand tracking and gesture recognition, it can still be difficult to distinguish between similar hand configuration and/or the how a controller is being held (e.g., the precise orientation of the controller in the hand). The use of two or more markers 56, 58, physically separated by a known distance, and coupled with the orientation data derived from the onboard IMU 44 of the Controller 40, provides increased accuracy and resolution while, at the same time, reducing the processing overhead required of other methods (such as hand tracking, pose recognition and/or skeletal segmentation/analysis). While hand tracking can be useful in identifying the region in the AR field where a hand is located, it can be difficult to detect precise location and/or fine rotational details based on hand tracking alone.

The physical separation between the two optical markers 56, 58 also allows for greater angular resolution with optical tracking than conventional approaches. Even greater resolution can be achieved by combining the location data derived from the optical system 16 of HMD 10 with the orientation data derived from the IMU 44 of Controller 40.

In addition, the combination of the markers and the IMU gives you greater accuracy and resolution without having to perform computationally intensive processing necessary for hand tracking and gesture recognition. And, because you are just dealing with two points in space that can be accurately identified by the optical sensor 16, it is also possible to detect small changes in orientation and/or rotational of the Controller.

Another aspect of the invention is to provide a system that includes a HUD device in combination with a wireless hand-held controller with passive optical and inertial tracking apparatus having slim form-factor. In one embodiment, the system can include: a head mounted display device having a processor; a wireless hand-held inertial controller configured to communicate with the processor to selectively provide one or more user inputs, the hand-held inertial controller comprising a stylus having a first end, a second end and an elongate middle portion between the first end and the second end, the stylus also including a first optically reflective marker at or proximate the first end and a second optically reflective marker at or proximate the second end; and the elongate middle portion enclosing a microcontroller, an inertial measurement unit, a communications radio and one or more buttons configured and positioned for selective actuation with a finger or thumb of a user, the inertial measurement unit tracking orientation of the hand-held inertial controller in three dimensional space relative to a predetermined frame of reference and providing orientation and acceleration data to the microcontroller, and the communications radio providing wireless communications so as to provide orientation data and user inputs to the processor; and an optical sensor located on the display for determining the position of each of the first and second optically reflective markers relative to the display and for providing position data to the processor, wherein the processor uses the orientation data and the position data to track the hand-held inertial controller within three dimensional space with six degrees of freedom.

Robust Optical Disambiguation and Tracking of Two or More Hand-Held Controllers with Passive Optical and Inertial Tracking When only a single Controller 40 is actively paired with HMD device 10 and located within the FOV of the HMD device 10, the tasks of locating the position of each optical marker 56, 58, uniquely identifying each optical marker 56, 58 and determining their relative positions to one another (and/or relative to the IMU 44 of the Controller 40), and associating the optical markers 56, 58 with a particular Controller 40 is relatively straightforward and is carried out as set forth above. However, When multiple controllers are used simultaneously, they can be visually identical, which creates additional challenges when trying to identify which marker is which, and which markers are associated with which controller, both initially and while tracking them through space and time. An invention is directed to apparatus, systems and methods for robust optical disambiguation and tracking of two or more handheld controllers with passive optical and inertial tracking as set forth in more detail below. In one embodiment, one such method can include: for each controller, establishing a wireless connection with the display device and assigning a unique controller ID to each controller; locating, by the optical sensor, each marker within the field of view of the display device; uniquely identifying each marker by performing one or more of the following acts—computing the distance separating each marker from each other marker, comparing each such distance to the known distance, and assigning an energy value to each possible marker pair that is proportional to the correspondence or lack thereof; for each possible marker pair, comparing the vertical tilt between each such marker as detected by the optical system and with the vertical tilt of each controller based on its inertial data and assigning an energy value proportional to the correspondence or lack; comparing any movement of each marker as detected by the optical sensor during a specified period of time, against inertial data for each controller indicating acceleration of such controller during the same period of time and assigning an energy value proportional to the correspondence or lack thereof; and using the energy values to uniquely identify each marker, create associations between specific markers and/or create associations between specific markers and specific controllers.

A combination of inertial data from each controller, physical geometric constraints, and motion signatures are used assess potential marker pairs and matches with a particular controller (to a predetermined level of confidence) and to prune out impossible marker matches. Additionally, since the controller is hand-held, it is also possible to identify and track the hands holding the controller, further constraining the identity of the markers located in the immediate vicinity of a particular hand.

Figure 9:
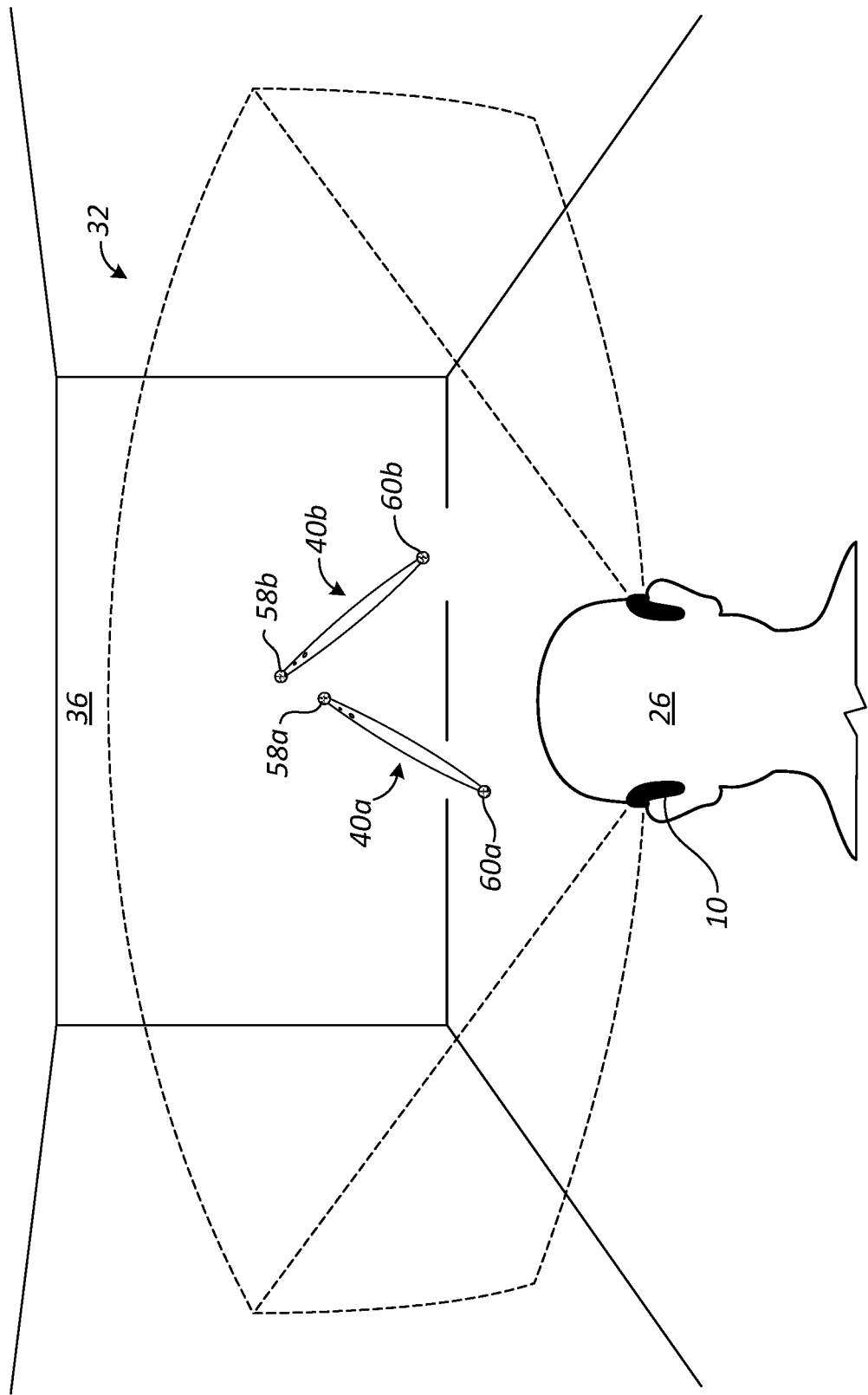
FIG. 9 is a graphical representation of one example of a possible field of view of one embodiment of an augmented reality display with two wireless hand-held inertial controllers positioned within the field of view of the augmented reality display.

FIG. 9 schematically illustrates the FOV of a HUD device 10, with two separate Controllers 40*a* and 40*b* located within the FOV. Controller 40*a* includes optically reflective markers 58*a* and 60*a*, and Controller 40*b* incorporates optically reflective markers 58*b* and 60*b*. As previously discussed, each Controller 40*a* and 40*b* has a unique serial number and/or other controller ID that uniquely identifies it, as well as all data transmitted by it to the HMD device 10.

Figure 12:
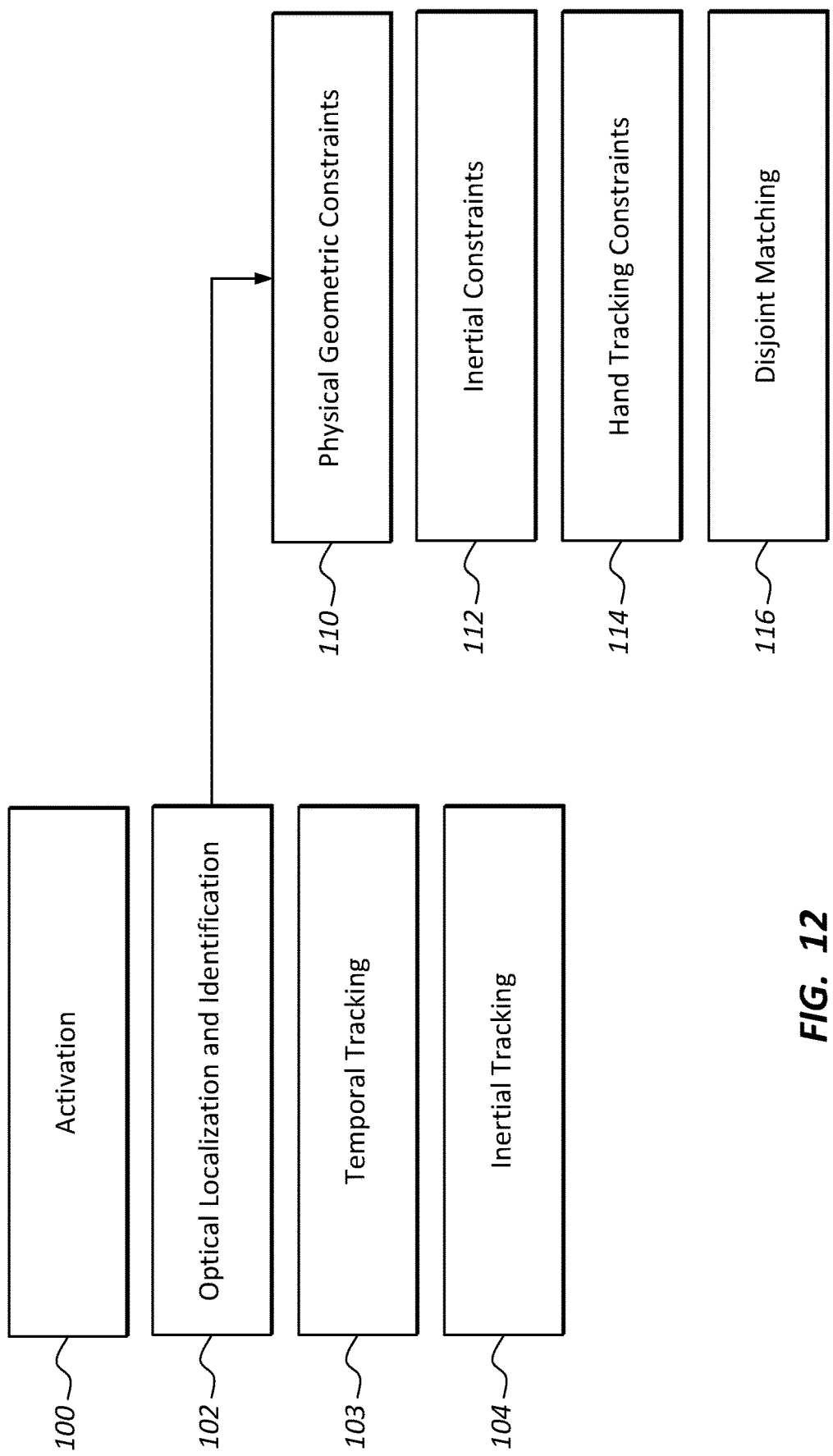
FIG. 12 is block diagram of an additional embodiment of a method for disambiguation and tracking of two or more hand-held controllers with passive optical and inertial tracking.

Referring to FIG. 12, the process of identifying and tracking a particular controller can include any or all of the following four stages, until such time as the tracking system of the HMD device 10 detects a confidence level high enough to accurately identify a specific optical marker, such as optical markers 58a, 60a, 58b or 60b), associate it with a specific controller, such as Controller 40a or 40b, and identify the specific position or location of each specific marker relative to its associated other marker as well as relative to its associated controller (or more specifically relative to IMU incorporated in its associated controller): (1) activation as indicated at 100; (2) optical localization and identification 102; (3) temporal tracking 104; and/or (4) inertial tracking 106.

Activation

As discussed previously, controller is active when it reports raw (e.g., accelerometer, gyroscope, magnetometer) or fused (e.g. quaternion) IMU data. In the activation stage, the controller establishes a connection with the HMD device 10 and thereafter reports 3DOF orientation in a gravity aligned coordinate system.

Localization/Identification

Optical localization occurs when two optical markers are visible and identified unambiguously from a larger pool of marker detections (i.e., from more than one controller or other spurious outliers) using inertial and physical geometric constraints, as well as hand tracking constraints. The localization phase can span several frames of video captured by the optical system 16 of the HMD device 10.

The assignment of optically detected markers to physical markers from different active controllers is optimized by minimizing an energy score or, conversely maximizing a confidence level that a specific marker should be matched to a specific other marker and/or to a specific controller. Referring to FIG. 13, this can be done by analyzing one or more of the following properties and characteristics until such time as a particular assignment can be confirmed or dismissed by the tracking system to a predetermined level of confidence: physical geometric constraints 110; inertial constraints 112; hand tracking constraints 14; and/or disjoint matching 116.

Figure 10:
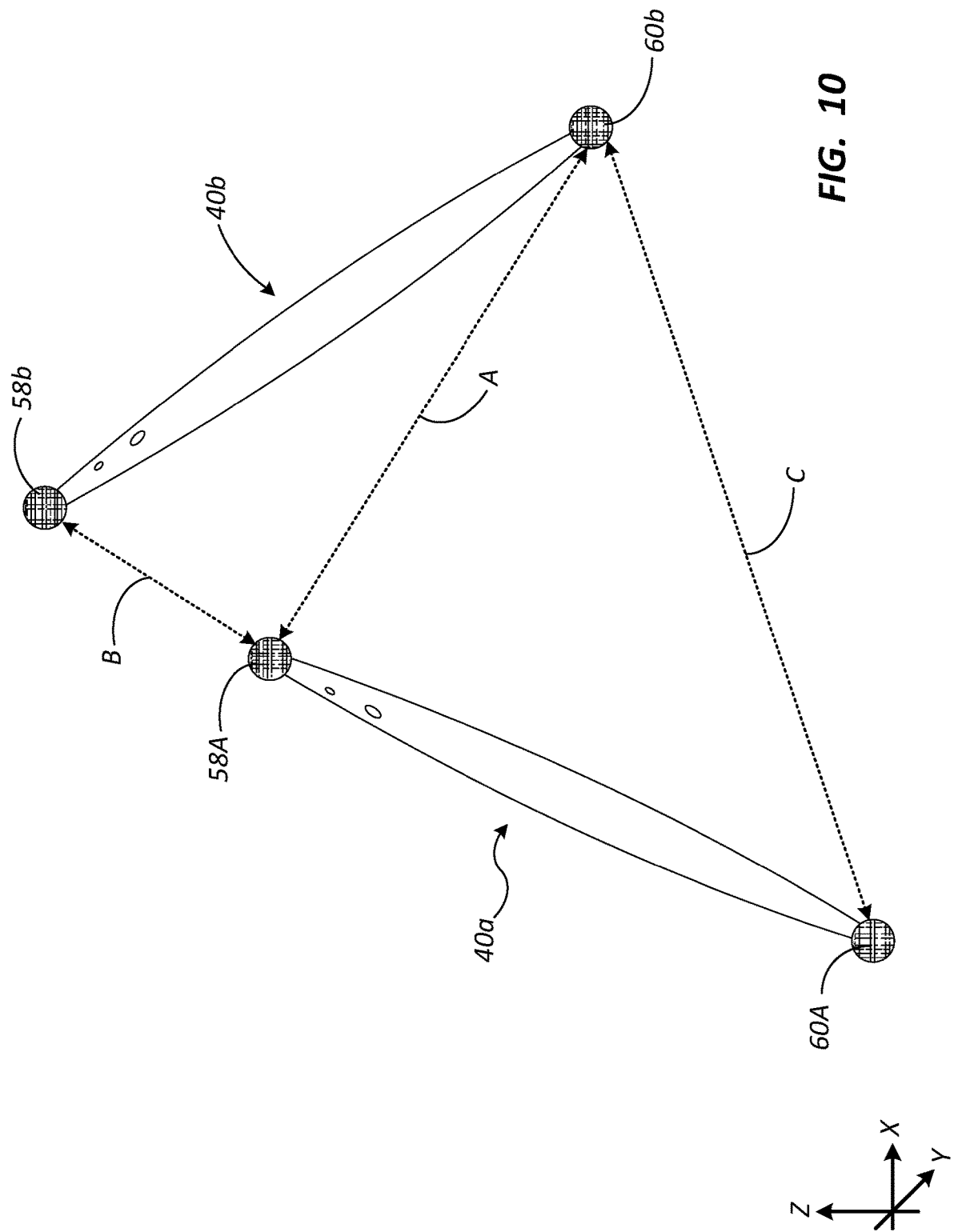
FIG. 10 is a detail view of the two wireless hand-held inertial controllers positioned within the field of view of the augmented reality display.
Figure 11:
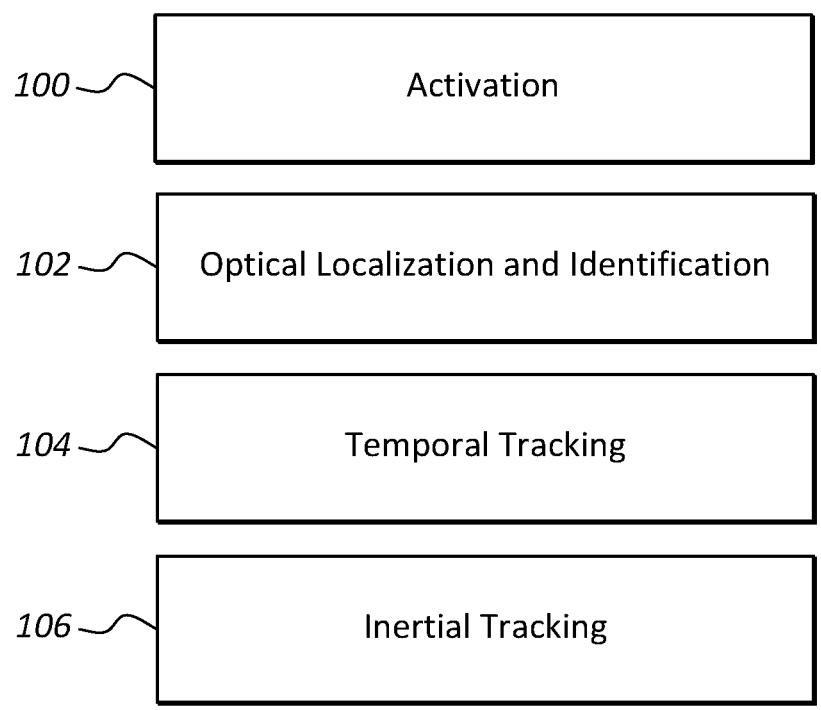
FIGS. 11 is a block diagram of one embodiment of a method for disambiguation and tracking of two or more hand-held controllers with passive optical and inertial tracking.

Referring to FIG. 10, one example of analyzing the geometric physical constraints in identifying and associated two reflective optical markers is provided. In this case, the distance between each pair of optical markers, such as the distances indicated by lines A, B and C, can be compared to known distance separating the markers based on the fixed physical geometry of Controller 40. For example, the distance A separating markers 58a and 60b is approximately the same as the actual known physical separation between the markers. Therefore, it possible, though at this stage in the analysis, that markers 58a and 60b could potentially be associated together and it would be necessary to consider one or more of the other factors discussed below before that combination (markers 58a and 60b) could be either confirmed to rejected.

However, considering the distance B separating marker 58a and 58b would indicate, with a fairly high degree of certainty that those two markers cannot constitute a matching pair, since distance B is much shorter than the known physical distance separating the markers. So, in that case, the tracking system would associate a high energy score to the potential association of markers 58a and 58b. If that high energy score alone is sufficient to equal or exceed some predetermined energy score maximum, that factor alone may eliminate markers 58a and 58b as a possibility (and, therefore, would be no need to consider other factors).

Similarly, considering the distance C separating markers 60a and 60b would indicate, with a fairly high degree of certainty that those two markers cannot constitute a matching pair, since distance C is much greater than the known physical distance separating the markers. So, in that case, the tracking system would also associate a high energy score to the potential association of markers 60a and 60b. If that high energy score alone is sufficient to equal or exceed some predetermined energy score maximum, that factor alone may eliminate markers 60a and 60b as a possibility (and, therefore, would be no need to consider other factors). This process can continue until the tracking system has considered all possible combinations of marker pairs and determined an appropriate energy score for each combination. If, based on the energy scores of all potential combinations, reveals to a sufficient degree of certainty that only one possible pairing outcome is possible (for example if the two controllers are separated for a distance that far exceeds the known physical distance separating the markers), then it could be possible for the tracking system uniquely identify (and associate a unique marker ID with) each marker and created an association between each marker and its identified mate, without the need for further analysis.

Other physical geometric constraints used to uniquely locate and identify markers can include the diameter of spherical retro-reflective markers and stereo triangulation error (for the stereo embodiment)

In addition to physical geometric constraints, inertial constraints can also be analyzed and an energy score used to uniquely locate and identify each optical marker. For example, once a potential combination of two markers is identified, data relating to the vertical tilt and/or azimuth angle derived by the optical sensor can be compared to the vertical tilt and/or azimuth angle reported by each of the Controllers. For example, referring again to FIG. 10, and again to the potential pairing of marker 60a and 60b, the optical system 16 of HUD device 10 can calculate (based on the location of those two points is space) the vertical tilt and/or azimuth angle represented by those two points. The tracking system can then compare those data points against the vertical tilt and/or azimuth angle reported by IMU of Controller 40a and against the vertical tilt and/or azimuth angle reported by the IMU of Controller 40b. Based on the correlation, or lack thereof, between those data points, the tracking system can assign an energy score to the potential pairing of markers 60a and 60b. In the case of markers 60a and 60b, a relatively high energy score would be assigned due to the fact that the relative elevation angles and azimuth angles based on the locations of markers 60a and 60b would be significantly different that those reported by the IMUs of Controllers 40a and 40b. Once again, this alone or in combination with the energy score based on the physical geometric constraints could be sufficient for the tracking system to decisively eliminate markers 60a and 60b as an appropriate pair.

In addition, acceleration data obtained by IMUs of Controllers 44a and 44b can also be used to identify specific markers and associate those markers with a specific controller. For example, this can be accomplished by comparing the relative locations of each marker, as determined by the optical system 16, between successive video frames with acceleration data over the same time period reported by the IMUs of Controller 40a and 40b. More specifically, if the optical system detects that two markers, such as markers 58a and 58b changed positions between successive video frames and, during that same period of time, only the IMU associated with Controller 40a reported acceleration data consistent with movement, then that would provide a good indication (and low energy score) that markers 58a and 58b should be associated with Controller 40a and, conversely, that would also provide a good indication (and a high energy score) that markers 58a and 58b should not be associated with Controller 40b.

Similarly, hand tracking constraint and disjoint matching can also be analyzed and evaluated to accurately locate and uniquely and unambiguously identify each marker and its proper association with another marker, a particular controller and/or a particular hand. As previously discussed above, such hand tracking constraints can include the distance from hand centroids (palm, fingers) to optical markers, hand poses consistent with holding a controller, the location of primary button relative to hand, etc. With respect to disjoint matching, the same optically detected marker cannot be matched with multiple physical markers from more than one controller.

When using two controllers, one in each hand, it is also possible to further differentiate which hand holds which controller by matching the hand trajectory as observed by the hand tracking sensor with the acceleration data from the IMU of each controller over a period of time. During localization, the controller ID is associated with the hand ID, which is weakly maintained during temporal tracking (which is to say a controller is expected to remain in one hand most of the time, unless and until further tracking and processing by the tracking system indicates that the controller is no longer present in that hand and/or has been transferred to the other hand).

Once all ambiguities have been eliminated and each optical marker has been specifically located and identified, each optical marker is assigned a unique marker ID that is used for future tracking. Similarly, once each marker has been unambiguously identified with a specific controller, an association between that marker's marker ID and the controller ID is created. And finally, each marker and each controller can be associated with a particular hand ID. Such associations can be persisted unless and until further analysis and processing by the tracking system determines, to a predetermined level of certainty, that any such association is no longer valid, at which point the process of localization and identification repeats until any new potential ambiguity (as to location, identification and/or association of any element) is resolved.

Temporal Tracking

Temporal tracking continues after successful localization, but relaxes the constraint that two optical markers are visible for a controller. 6DOF tracking is still achieved when one of the markers becomes occluded, since one marker is sufficient to recover position, with orientation coming from the IMU. Alternatively, 6DOF tracking continues when both markers are occluded but the assigned hand is still tracked.

As previously discussed, the identity of the marker is persisted by proximity to previously estimated position of the markers, as well as in relation to the position of the tracked hand (e.g., is the marker closer/further/higher/lower than the hand). Given the position of the hand and the orientation of the IMU, the probability of a marker being occluded is also being computed and leveraged for marker identification.

When two markers are visible, both horizontal and vertical angle constraints are being enforced, in addition to the constraints used for Localization, as well as translation error from previous estimated position. The azimuth offset between the controller and the optical sensor frames of reference is also updated in this case. Mismatching values can be used to eliminate outlier marker detections.

Inertial Tracking

When a device becomes fully occluded or goes outside of the field of view of the sensor for some time, it goes into inertial tracking mode. In inertial mode, orientation of the controller can still be computed directly from the IMU data in the global frame of reference, while position can potentially be updated by forward location prediction, based on the accelerometer data being fused using a Kalman filter using double integration, until the controller can be re-localized.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
    at least one processor; and
    at least one computer readable storage medium having stored thereon computer executable instructions that are executable by the at least one processor to cause the computing system to track at least two wireless handheld inertial controllers at a display device, each inertial controller capable of determining inertial data corresponding to an orientation of the inertial controller, the computer-executable instructions including instructions that are executable to cause the computing system to perform at least the following:
        establish a wireless connection between the at least two inertial controllers and the display device;
        locate, by an optical sensor, a plurality of optically reflective markers positioned on the at least two inertial controllers, including locating a first pair of markers a first known distance apart on a first inertial controller and a second pair of markers a second known distance apart on a second inertial controller;
        compute a distance separating each optically reflective marker from each other optically reflective marker in the plurality of optically reflective markers, compare each computed distance to the known first and second distances, and, based on the comparison assign a corresponding first energy value to each possible marker pair; and
        localize and uniquely identify each optically reflective marker in the plurality of optically reflective markers, including at least:
            for each possible marker pair, comparing a tilt between markers in the pair as located by the optical sensor with a tilt of each inertial controller, based on the controller's inertial data, and assigning a second energy value based on the comparison; and
            using one or more of the first and second energy values to uniquely identify each optically reflective marker.

2. The computing system of claim 1, wherein localizing and identifying each optically reflective marker further comprises:
    temporal tracking, by the optical sensor, to generate location data representative of the location of each optically reflective marker;
    inertial tracking, to generate orientation data representative of the orientation of the controller;
    uniquely identifying each optically reflective marker based on comparing the location data and the orientation data; and
    associating a unique marker ID with each optically reflective marker.

3. The computing system of claim 2, the computer-executable instructions also including instructions that are executable to cause the computing system to create an association between each unique marker ID and a unique controller ID.

4. The computing system of claim 3, wherein uniquely identifying each optically reflective marker comprises one or more of the following:
    upon detecting two optically reflective markers located within a field of view of the display device, computing the distance separating the two optically reflective markers; and
    comparing the computed distance separating the detected optically reflective markers with the first known distance or the second known distance.

5. The computing system of claim 3, wherein uniquely identifying each optically reflective marker comprises one or more of the following:
    detecting, based on the inertial data received from the inertial controller, vertical tilt data representative of the vertical tilt of the inertial controller;
    detecting, by the optical sensor, position data representative of the position of each marker relative to the other marker to identify which one of the markers is located at a point that is higher than the other one of the markers; and
    comparing the vertical tilt data with the position data to uniquely identify each marker.

6. The computing system of claim 3, wherein uniquely identifying each optically reflective marker further comprises one or more of the following:

tracking, by the optical sensor, movement of each optically reflective marker during a specified period of time to generate location data representative of the location and movement of each optically reflective marker;

tracking, by the inertial controller, movement of the inertial controller during the specified period of time to generate orientation data representative of the movement of each optically reflective marker; and comparing the location data with the orientation data to uniquely identify each optically reflective marker.

7. The computing system of claim 3, wherein uniquely identifying each optically reflective marker further comprises one or more of the following:

tracking, by the optical sensor, movement of each optically reflective marker during a specified period of time to generate first acceleration data representative of the movement of each optically reflective marker;

tracking, by the inertial controller, movement of the inertial controller during the specified period of time to generate second acceleration data representative of the movement of each optically reflective marker; and comparing the first acceleration data with the second acceleration data to uniquely identify each optically reflective marker.

8. The computing system of claim 3, wherein uniquely identifying each optically reflective marker comprises one or more of the following:

utilizing acceleration data sampled over a period of time to predict a future location of one of the optically reflective markers; and comparing a detected location of the optically reflective marker with the predicted location of the optically reflective marker.

9. A method, operated at a computing system comprising one or more processors, for tracking at least two wireless hand-held inertial controllers at a display device, each inertial controller capable of determining inertial data corresponding to an orientation of the inertial controller, the method comprising:

locating, by an optical sensor, a plurality of optically reflective markers positioned on the at least two inertial controllers, including locating a first pair of markers a first known distance apart on a first inertial controller and a second pair of markers a second known distance apart on a second inertial controller;

computing a distance separating each optically reflective marker from each other optically reflective marker in the plurality of optically reflective markers, comparing each computed distance to the known first and second distances, and based on the comparison, assigning a corresponding first energy value to each possible marker pair; and localizing and uniquely identifying each optically reflective marker in the plurality of optically reflective markers, including at least:

for each possible marker pair, comparing an azimuth angle between markers in the pair as located by the optical sensor with azimuth angles of each inertial controller, based on the controller's inertial data, and assign a second energy value based on the comparison; and using one or more of the first and second energy values to uniquely identify each optically reflective marker.

10. The method of claim 9, wherein uniquely identifying each optically reflective marker further comprises:

detecting, based on the inertial data received from the at least two inertial controllers, tilt data representative of the tilt of the at least two controllers;

detecting, by the optical sensor, position data representative of the position of each optically reflective marker relative to the other optically reflective marker to identify which one of the optically reflective markers is located at a point that is higher than the other one of the optically reflective markers;

comparing the tilt data with the position data; and assigning a first value proportional to the correspondence or lack of correspondence between the tilt data with the position data.

11. The method of claim 10, wherein uniquely identifying each optically reflective marker further comprises one or more of the following:

tracking, by the optical sensor, movement of each optically reflective marker during a specified period of time to generate location data representative of the location and movement of each optically reflective marker;

tracking, by the inertial controller, movement of the inertial controller during the specified period of time to generate orientation data representative of the movement of each optically reflective marker;

comparing the location data with the orientation data; and assigning a second value proportional to the correspondence or lack of correspondence between the location data and the orientation data.

12. The method of claim 9, wherein uniquely identifying each optically reflective marker further comprises at least:

tracking, by the optical sensor, movement of optically reflective each marker during a specified period of time to generate first acceleration data representative of the movement of each optically reflective marker;

tracking, by the inertial controller, movement of the inertial controller during the specified period of time to generate second acceleration data representative of the movement of each optically reflective marker;

comparing the first acceleration data with the second acceleration data; and assigning a third value proportional to the correspondence or lack of correspondence between the first acceleration data with the second acceleration data.

13. The method of claim 9, wherein uniquely identifying each optically reflective marker further comprises:

utilizing acceleration data sampled over a period of time to predict a future location of one of the optically reflective markers; and comparing a detected location of the optically reflective marker with the predicted location of the optically reflective marker.

14. The method of claim 13, further comprising assigning a fourth value proportional to the correspondence or lack of correspondence between the predicted location and the detected location.

15. The method of claim 14, further comprising:

summing the first, second, and third and fourth values; and comparing the sum to a predetermined threshold value.

16. The method of claim 15, further comprising establishing a wireless connection between the at least two inertial controllers and the display device.

17. The method of claim 16, further comprising assigning a unique controller ID to each of the at least two inertial controllers.

18. The method of claim 9, further comprising assigning a unique marker ID to each of the uniquely identified optically reflective markers.

19. The method of claim 18, further comprising creating an association between unique controller ID and each of the unique marker IDs.

20. A computer program product comprising at least one hardware storage device having stored thereon computer executable instructions that are executable by at least one processor to cause a computing system to track at least two wireless hand-held inertial controllers at a display device, each inertial controller capable of determining inertial data corresponding to an orientation of the inertial controller, the computer-executable instructions including instructions that are executable to cause the computing system to perform at least the following:

locate, by an optical sensor, a plurality of optically reflective markers positioned on the at least two inertial controllers, including locating a first pair of markers a first known distance apart on a first inertial controller and a second pair of markers a second known distance apart on a second inertial controller;

compute a distance separating each optically reflective marker from each other optically reflective marker in the plurality of optically reflective markers, compare each computed distance to the known first and second distances, and based on the comparison, assign a corresponding first energy value to each possible marker pair; and localize and uniquely identify each optically reflective marker in the plurality of optically reflective markers, including at least:

for each possible marker pair, comparing any movement between markers in the pair, as located by the optical sensor during a specified period of time, against inertial data of each inertial controller indicating acceleration of each inertial controller during the same period of time, and assign a second energy value based on the comparison; and using one or more of the first and second energy values to uniquely identify each optically reflective marker of the plurality of optically reflective markers.

* * * * *